United States Patent [19]

Zucker et al.

[11] 3,723,655
[45] Mar. 27, 1973

[54] CREDIT AUTHORIZATION SYSTEM TERMINAL

[75] Inventors: Fredric E. Zucker; James P. Murphy; Lawrence J. Smith; Joseph Kaswer, Jr., all of Stamford, Conn.

[73] Assignee: Pitney-Bowes, Inc., Stamford, Conn.

[22] Filed: Feb. 16, 1971

[21] Appl. No.: 115,655

[52] U.S. Cl. ......... 179/2 DP, 340/149 A, 179/2 CA, 235/61.7 B
[51] Int. Cl. ............................................. H04m 11/06
[58] Field of Search ............. 179/2 CA, 2 DP, 90 CS; 235/61.7 B, 61.12 R; 340/149 A, 152, 149 R

[56] References Cited

UNITED STATES PATENTS

| | | | |
|---|---|---|---|
| 3,308,238 | 3/1967 | Brothman | 179/2 DP |
| 3,512,130 | 5/1970 | Hulett | 235/61.7 B |
| 3,359,369 | 12/1967 | Di Iorio | 179/2 DP |
| 3,617,638 | 11/1971 | Kok et al. | 179/2 DP |
| 3,559,175 | 1/1971 | Pomeroy | 340/149 A |
| 3,515,806 | 6/1970 | Spraker | 179/2 DP |
| 3,609,248 | 9/1971 | Wolf | 179/2 DP |
| 3,039,582 | 1/1962 | Simjian | 235/61.11 |
| 3,184,714 | 5/1965 | Brown | 340/149 |

*Primary Examiner*—Kathleen H. Claffy
*Assistant Examiner*—Thomas D'Amico
*Attorney*—William D. Soltow, Jr., Albert W. Scribner, Martin D. Wittstein and Louis A. Tirelli

[57] ABSTRACT

To verify the standing of a credit card account, a terminal is provided at the point of sale. The terminal automatically establishes telephone communication with a remotely located central data processor where data concerning the credit card account is stored.

The terminal includes: a replaceable storage medium which retains data for establishing the telephone connection with the data processor, as well as for identifying the terminal; a credit card reader which generates signals to identify the account for which credit is sought; and a keyboard used to transmit transaction-related data, such as dollar amounts. A cycle controller steps the terminal through successive operation modes, including receipt of return data from the data processor. The return data includes instructions which are decoded and displayed by the terminal to indicate the credit standing of the account. Various terminal circuits recognize erroneous conditions such as wrong orientation of the credit card, failure to enter keyboard data, or lack of communication line continuity to the data processor.

7 Claims, 18 Drawing Figures

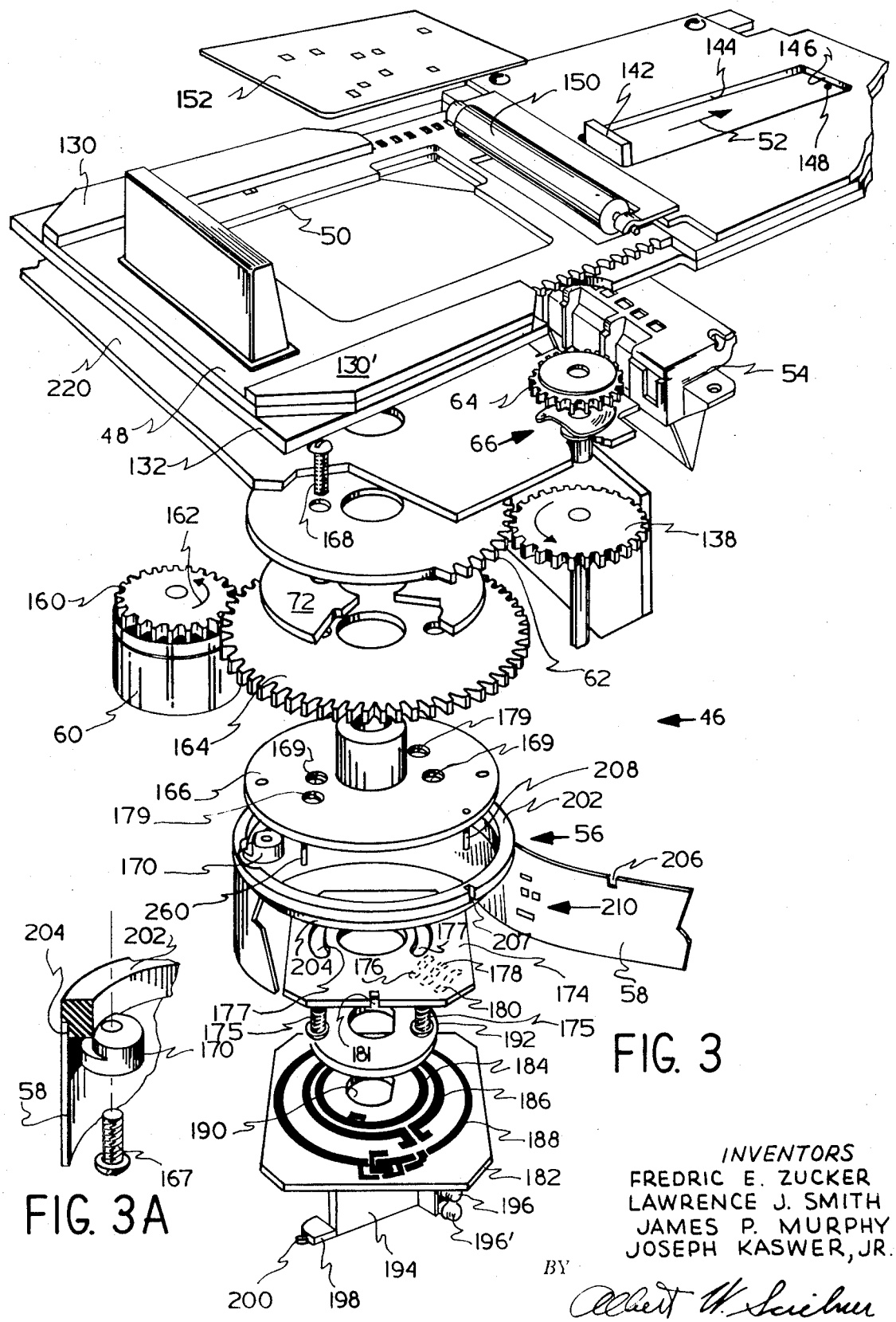

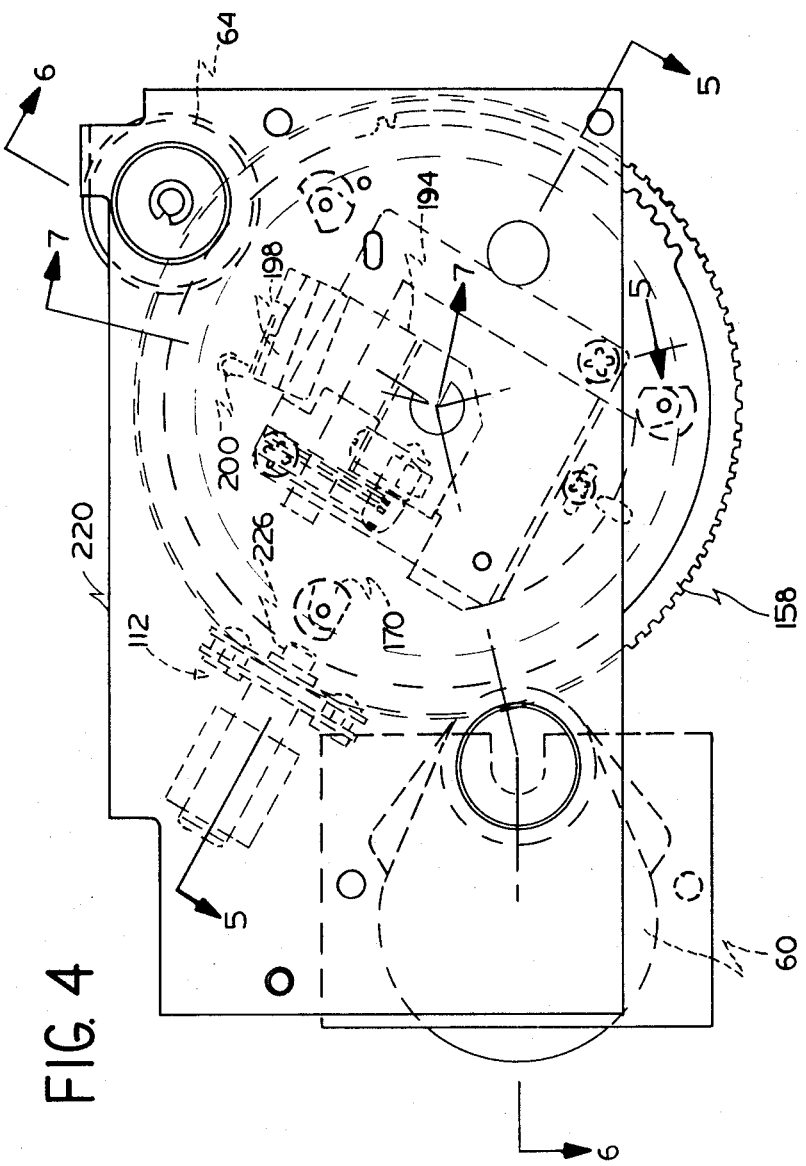

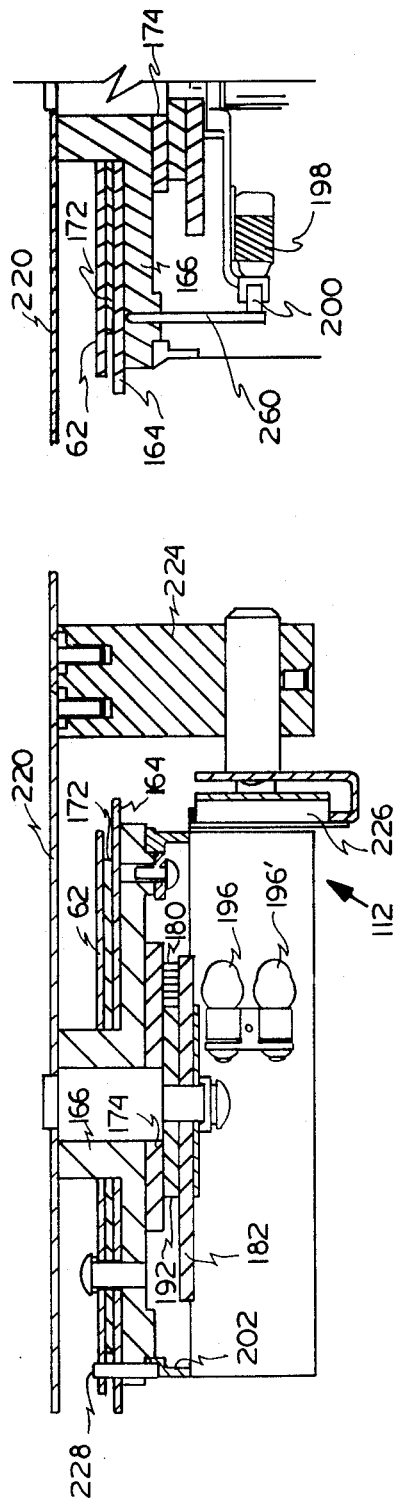
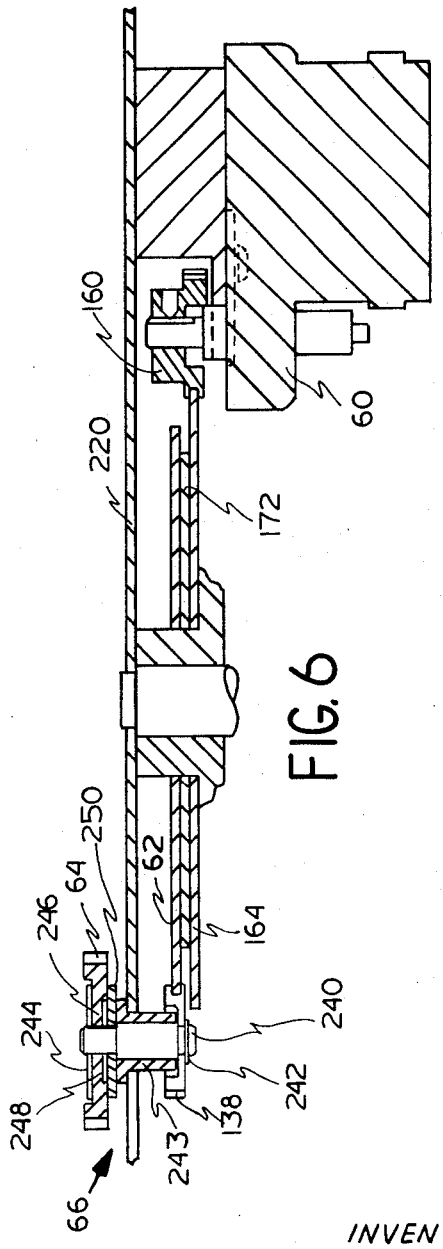

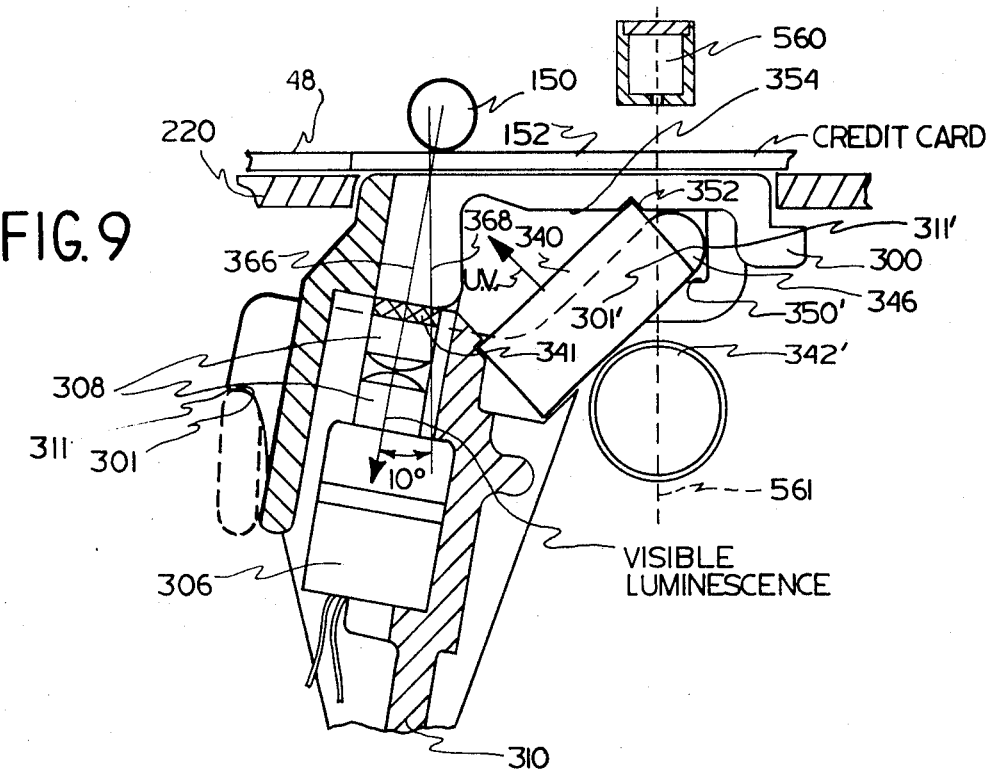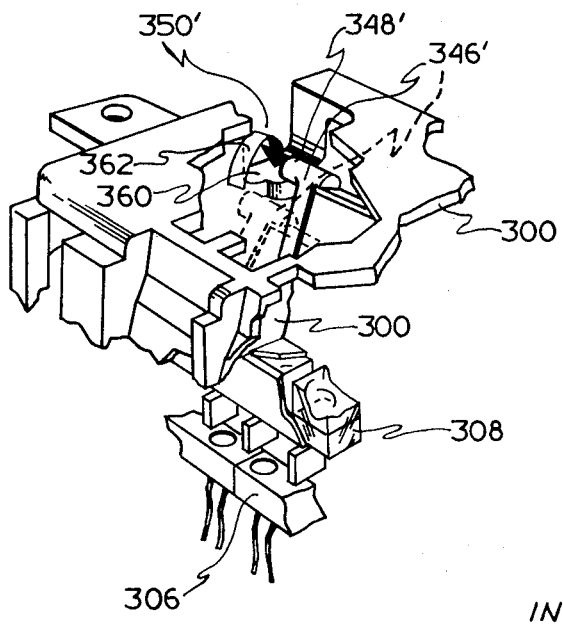

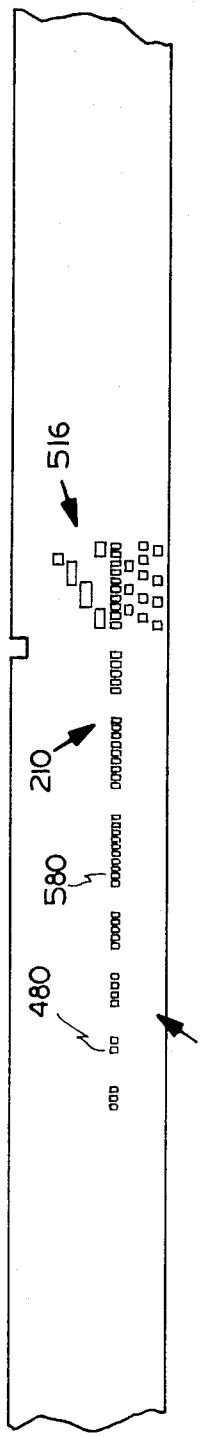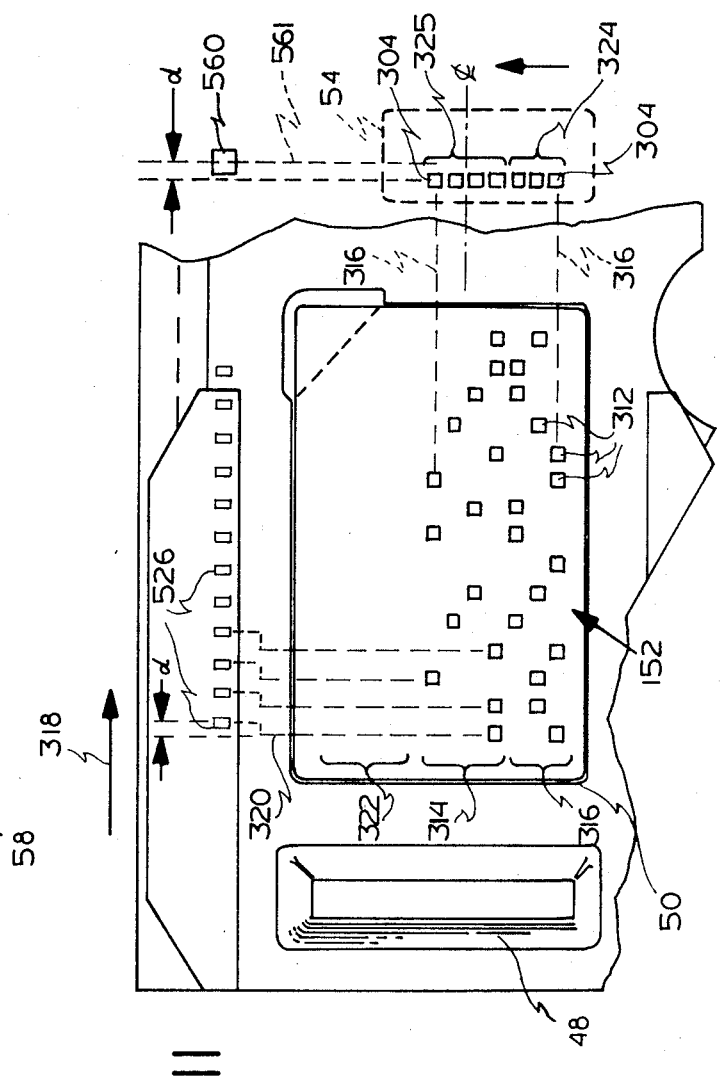

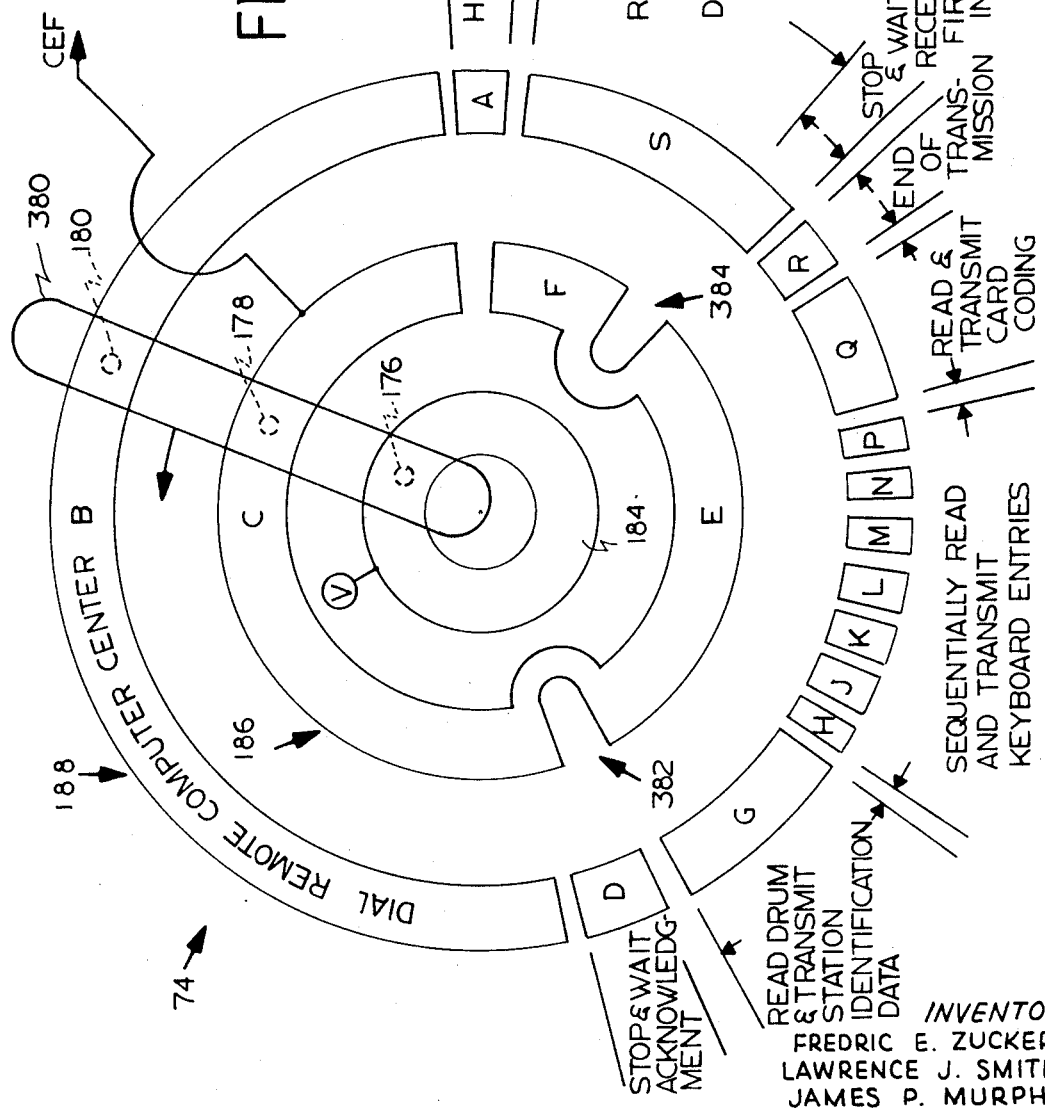

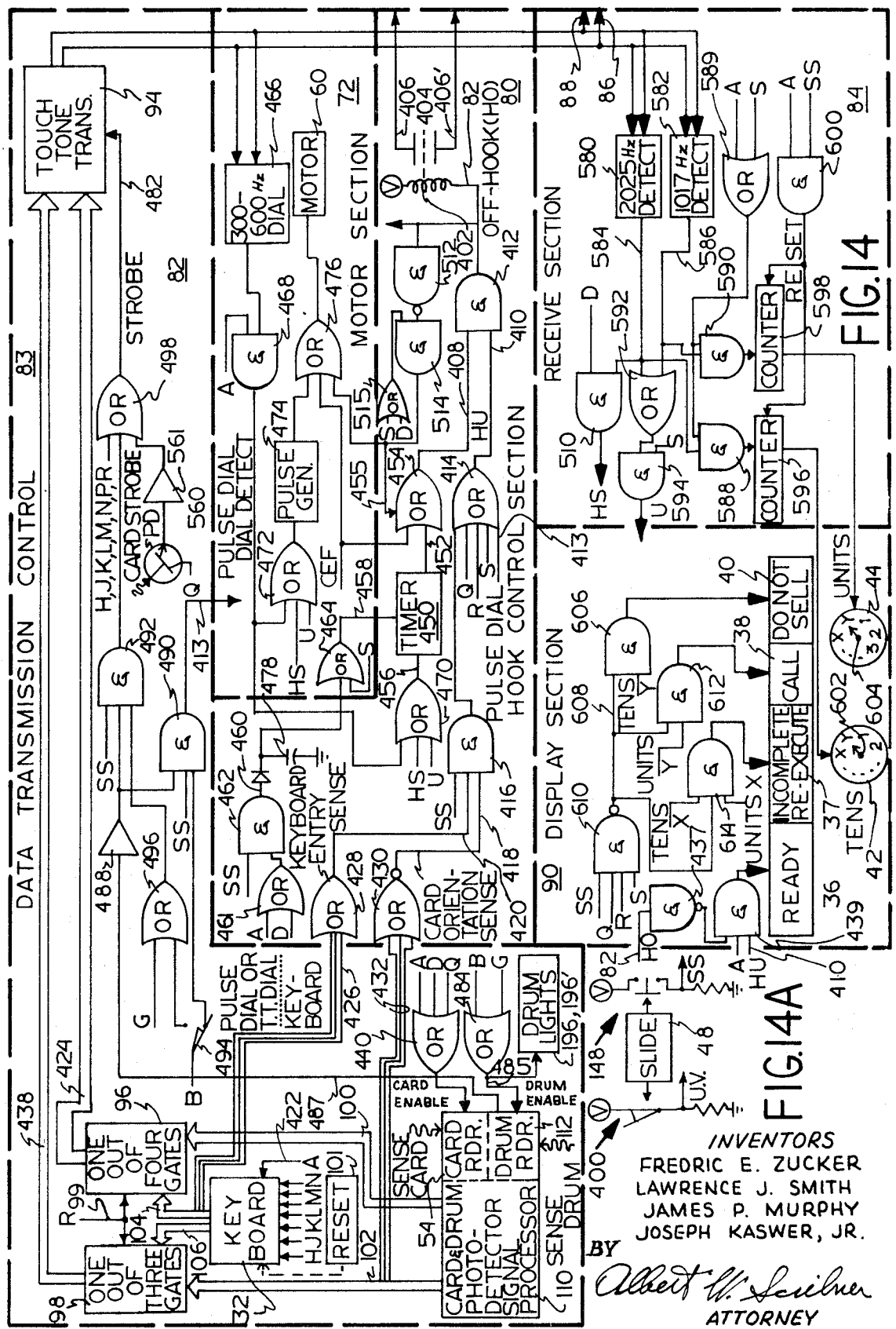

CREDIT AUTHORIZATION SYSTEM TERMINAL

BACKGROUND OF THE INVENTION

This invention relates to a credit authorization system terminal, more specifically a terminal device for automatically communicating with a remotely located data processor to determine whether credit should be granted.

In a credit authorization system as generally known in the art, the granting of credit to a credit card holder is checked against account data stored in a central data processor. A point-of-sale terminal is coupled (usually by voice grade telephone lines) to the centrally located data processor to provide transaction information such as the account number recorded on the credit card, terminal-identifying data, and the amount of the sale. The data processor responds with instruction data which indicates whether credit should be granted.

SUMMARY OF THE INVENTION

In a credit authorization system in accordance with the invention, point-of-sale terminals are provided which automatically communicate with a remotely located data processor to obtain credit authorization. The credit authorization terminal operates on a fully automated cycle during which data in a terminal storage device is used to implement telephone connection with the remotely located data processor and transmit terminal identification data thereto. The terminal is provided with a keyboard to register financial data such as the amount of a sale, and the data generated by keyboard entries is also transmitted to the data processor. A credit card reader is employed to scan credit card indicia, which information is also automatically conveyed to the data processor to identify the account to be checked for credit authorization. After data transmission from the terminal, the data processor responds with instruction data which is decoded in the terminal and displayed. For example, instruction data indicating that credit should not be granted is displayed as a "do not sell" indication, while signals which authorize the granting of credit are accompanied by a transaction-identifying number display. Other possible responses are "incomplete, re-execute" (used in case of faulty data transmission), and "call" (used in a case where a simple response is inadequate, and voice communication is therefore required).

An advantageous feature of the present credit card terminal resides in the employment of a replaceable data storage device. The data storage includes data for automatic dialing of a stored telephone number to establish telephone communication between the terminal and the remotely located data processor, and additional data to identify the point of sale.

As described herein, a preferred embodiment of the invention utilizes a data storage device in the form of an opaque film strip having transparent spots to represent the stored data. The film strip is readily removed and installed in another terminal in the event of service interruption for repair or maintenance. In this manner, the terminal may be serviced with a minimum of inconvenience to the user.

The film strip advantageously converts a terminal to operate with any desired telephone dialing system. In some areas only telephone systems with conventional rotary pulse dialing devices are available, while other areas utilize push-button frequency-coded "Touch-Tone" telephone sets. The replaceable data storing film strip of this invention advantageously accommodates either one of these telephone dialing systems without complicated terminal design features.

A further advantageous feature of a credit authorization system terminal in accordance with the invention, is a fully automatic operation during which a variety of operationally defective conditions are detected and acted upon. The terminal includes a keyboard entry sensor which inhibits terminal startup unless at least one keyboard entry other than zero has been made, and a credit card orientation sensing feature prevents the terminal from contacting the data processor unless the credit card was properly placed in the terminal.

A controller is employed to generate cycle control signals which transfer the operation of the terminal from one operational mode to another. For example, during an early mode of operation, after the terminal has completed a telephone circuit to the remotely located data processor, the terminal enters a receive mode to verify the communication circuit. Circuit verification is obtained by decoding an acknowledgment signal from the data processor. If this acknowledgment is not received within a prescribed time, the terminal automatically disconnects itself from the telephone line and cycles to a home position. Hence, a failure to receive credit instruction signals from the data processor within a predetermined time period following terminal transmission results in a saving of telephone charges.

BRIEF DESCRIPTION OF THE DRAWINGS

FIG. 3 is an exploded perspective view of components utilized in an actuator section of the credit authorization terminal of FIG. 1.

FIG. 3A is an enlarged perspective view of a portion of the drum and drum fastener of FIG. 3.

FIG. 4 is a top plan view of the actuator section of FIG. 3.

FIG. 5 is a section view of the actuator of FIG. 4 and is taken along the line 5—5 thereof.

FIG. 6 is a section view of the actuator taken along the line 6—6 in FIG. 4.

FIG. 7 is a section view of the actuator taken along the line 7—7 in FIG. 4.

FIG. 9 is a section view of the assembled optical credit card reader.

FIG. 10 is a partial broken perspective view of the optical reader illustrated in FIG. 8.

FIG. 11 is a partial top plan view of a credit card slide used in the credit authorization terminal actuator shown in FIG. 3.

FIG. 12 is a partial side view of a data storage film strip employed with the credit authorization terminal of this invention.

FIG. 13 is a schematic representation of a commutator employed with the credit authorization terminal to control its cycle of operation, and FIG. 13A is an associated electrical circuit diagram.

FIG. 14 is a logic diagram and FIG. 14A is an associated electrical circuit diagram illustrating the operation of a controller used with the credit authorization terminal to control its cycle of operation.

DETAILED DESCRIPTION OF PREFERRED EMBODIMENT

Figure 1:
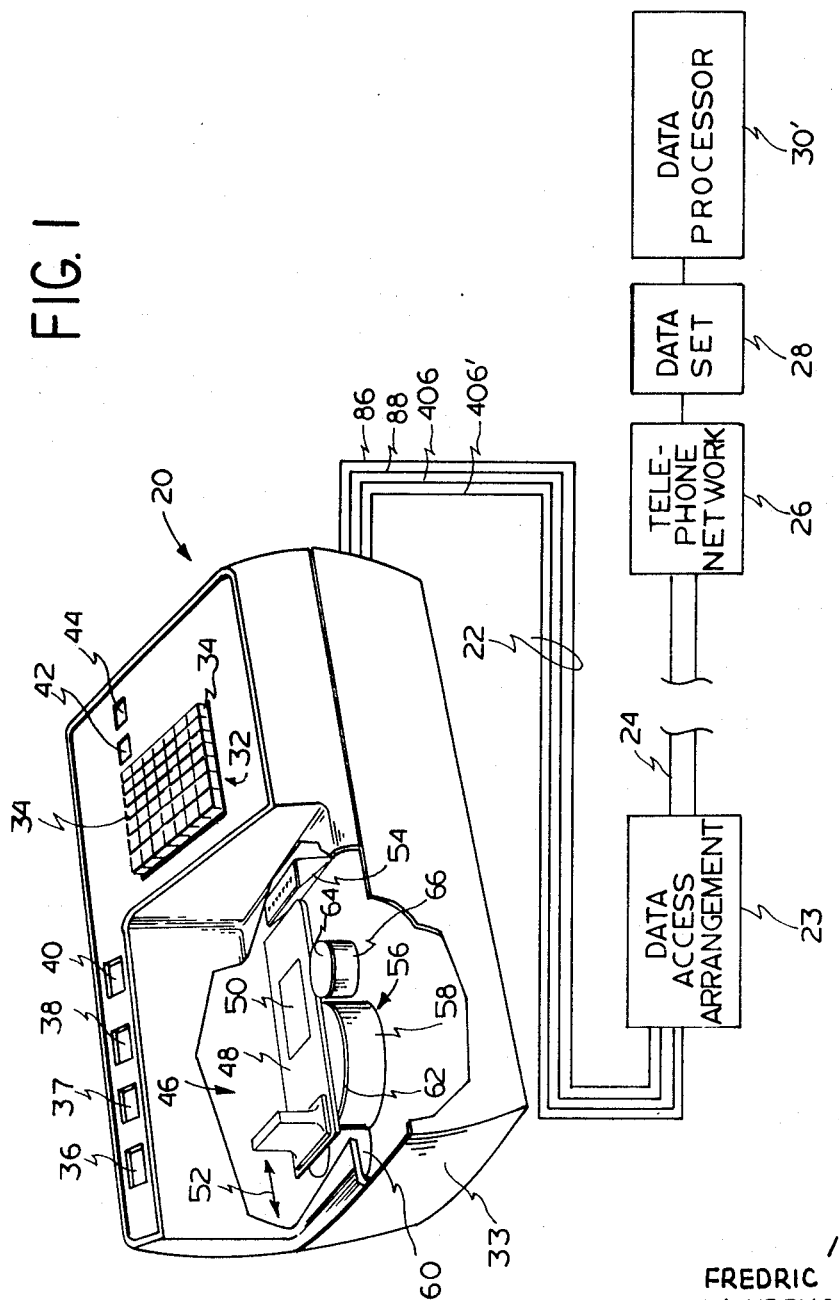
FIG. 1 is a perspective view of a credit authorization terminal in accordance with the invention, in which the terminal is partially broken away to reveal internal components, plus a block diagram of related system components for establishing telephone communication with a remotely located data processor.

With reference to FIG. 1, a credit authorization terminal 20 is illustrated connected through a cable 22 (including individual leads 86, 88, 406 and 406' discussed below) to a device known as a "data access arrangement" 23, i.e. equipment which is supplied by the telephone company for coupling to its telephone line 24. The telephone line 24 is connected through a telephone network 26 to a data set 28 (also provided by the telephone company) which is located adjacent to a remote data processor 30. The data processor 30 may be a general purpose computer capable of providing rapid real-time access to terminals such as 20. The credit authorization terminal 20 is located at a typical point of sale such as a hotel, restaurant, retail establishment and the like.

The terminal 20 is provided with a keyboard 32 mounted on a terminal housing 33. The keyboard contains a sufficient number of columns 34 to enter the dollar amount of a sale or other numerical data. Display indicators 36, 37, 38, 40, 42, and 44 indicate the results of a credit check performed by the data processor 30. A terminal actuator 46 is partially shown in FIG. 1, and includes a slide 48 having a credit-card-receiving recess 50. The slide 48 is mounted to housing 33 for reciprocating movement along directions indicated by arrow 52 over a credit card reader 54. The slide 48 is located over a data storage drum 56 which includes a data storage device in the form of a film strip 58 which is wrapped around a ring to form a hollow cylinder. The cylinder encloses a commutator and other components which are shown in greater detail in FIG. 3. A motor 60 is provided to rotate the drum 56 and retract the slide 48 after it has been moved over the card reader 54 at the beginning of the cycle of operation. Slide retraction is accomplished by a sector gear 62 which engages a slide pinion 64 through a friction clutch arrangement 66.

Briefly stated, the operating cycle of the terminal 20 is commenced by moving the slide 48 and a credit card (located in recess 50) past the optical card reader 54. The terminal motor 60 is automatically actuated to cause a rotation of drum 56 accompanied by reading of telephone number codings on the film strip 58. After the terminal has established telephone connection with the remotely located data processor 30, terminal identification data recorded on the film strip 58 is decoded and transmitted to the data processor followed by transmission of data representing keyboard entries.

After transmission of keyboard entry data, the optical card reader 54 is energized to detect coding spots on the credit card. The credit card codings are also transmitted to the data processor 30. Following transmission of this terminal data, the data processor returns instruction data which are decoded in the terminal 20 to actuate corresponding displays.

Figure 2:
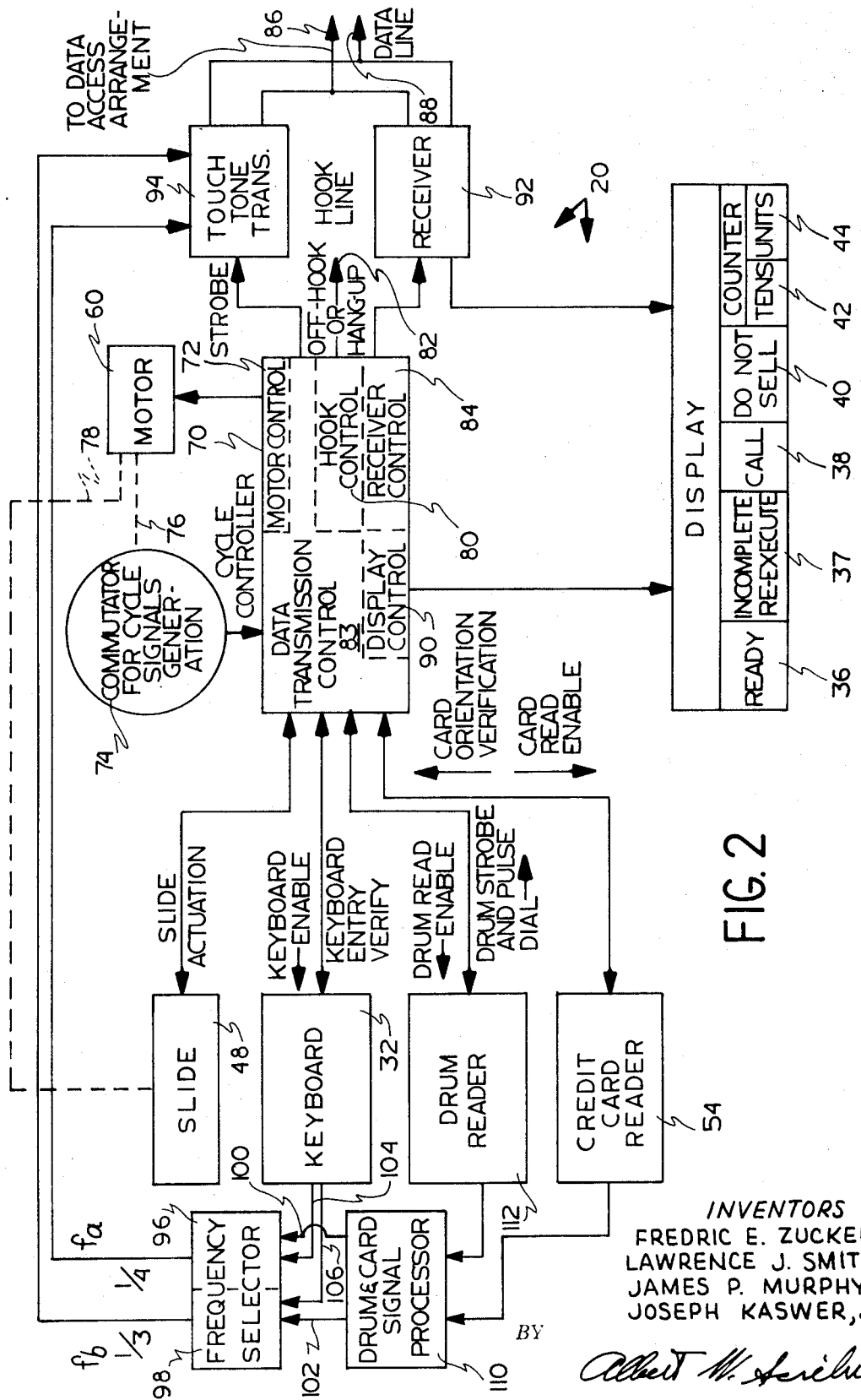
FIG. 2 is a block diagram of the credit authorization terminal shown in FIG. 1.

As seen in FIG. 2, the terminal 20 includes a cycle controller 70 provided with a motor control 72 which actuates motor 60. Motor 60 in turn drives a commutator 74 which generates cycle control signals that are applied to cycle controller 70. Motor 60 is shown operatively connected to both the commutator 74 and the slide 48 by means of dashed lines 76 and 78 respectively.

The cycle controller also includes a hook control network 80 which delivers a telephone enabling signal on a hook line 82 coupled to a relay in the data access arrangement 23 (not shown in FIG. 2). The signal on line 82 is digital in format, with one energized state producing an "off-hook" condition and the other deactivated state causing a "hang-up" condition in which the terminal is disconnected from the telephone line.

A data transmission control circuit 83 and a receiver control section 84 respectively enable the sending or receipt of data over data lines 86, 88 which are connected to the data access device 23. A display control section 90 provides control over the location at which data received from data processor 30 and decoded in receiver 92 is to be displayed or applied.

The data is transmitted from terminal 20 by a conventional "Touch-Tone" generator 94. The latter is well known, and produces pairs of frequency tones for each numeral transmitted. Each pair includes frequency tones $Fa$ and $Fb$, $Fa$ being selected from a group of four tones $Fa1$ through $Fa4$ and $Fb$ being selected from a group of three tones $Fb1$ through $Fb3$. The tone selection process in terminal 20 is carried out by frequency tone selector gates 96 and 98 which respectively select tone frequencies $Fa$ and $Fb$ depending upon the gating signals present on the gate inputs 100, 102, 104 and 106. The gating signals on lines 100 and 102 are obtained from a drum and card signal processor 110. This latter signal processor provides amplification and gating of photo-detectors in a drum reader 112 and photo-detectors in credit card reader 54. The signal processor 110 preferably is more particularly described in a co-pending U.S. Pat. application entitled Photoelectric Reader And Frequency Tone Code Converter filed by Laurence Smith on July 10, 1970, Ser. No. 53,835, and assigned to the assignee of this invention.

FIG. 2 indicates the types of signals which flow between the cycle controller 70 and other terminal components. Thus slide 48 provides a slide actuation signal when a slide switch is actuated at the beginning of the operating cycle. The keyboard 32 is supplied with enabling signals during "entry sensing," and returns a signal to the controller 70 to verify that an entry has been made. The drum reader 112 is provided with an enabling pulse, and returns a drum strobe pulse for the Touch-Tone converter 94 as well as a pulse dialing signal for the hook control 80 in localities where conventional telephone pulse dialing is used to connect the terminal 20 to the remotely located data processor.

The credit card reader 54 provides a credit card orientation signal which verifies the correct orientation of the card, and also provides a strobe pulse when the slide is retracted by motor 60. The strobe pulses are applied to transmitter 94. The dial tone signal detected in the receiver 92 is used to initiate and enable the circuitry in the controller used to dial a telephone connection to the data processor 30.

FIGS. 3 through 7 show the mechanical features of the actuator 46 of terminal 20 with greater detail. As shown in FIG. 3, slide 48 is mounted for sliding movement along arrow 52 between upper guide plates 130-130' and over a lower slide plate 132. One edge of slide 48 is shaped in the form of rack teeth 134 which are engaged by slide pinion 64. The slide pinion is coupled to a drive pinion 138 through friction clutch 66 which is more precisely shown in FIG. 6. A slide-connected tab 142 is shown protruding through a slot 144, one end of which at 146 is provided with a slide actuation sensing switch 148. The slide 48 moves below a pressure roller 150 which is located over the optical credit card reader 54 to keep the credit card that is placed in aperture 50 firmly pressed down against the reader 54. A credit card 152 is shown disposed over aperture 50, ready for deposit in recess 50 of the slide 48.

Motor 60 drives a pinion 160 into rotation in the direction shown by arrow 162. Pinion 160 drives a bull gear 164 which is firmly attached to drum 56 through a main hub 166 by screws such as 167 and quarter-turn fasteners such as 170 (see FIG. 3A). Bull gear 164 is also firmly connected to sector gear 62 through a spacer 172 by screws such as 168 threaded to tapped holes 169.

A shorting bar supporting plate 174 is mounted below hub 166 and is provided with three radially spaced and aligned electrically connected spring finger contacts 176, 178 and 180. These spring finger contacts are insulated from the plate 174 and are shaped for sliding engagement with conductive commutator segments 184, 186, and 188 located on a flat surface of a stationary commutator plate 182. The commutator segments are arranged in concentric circles whose radial positions relative to the axis of rotation of the drum 56 correspond with those of spring finger contact 176, 178 and 180 respectively.

The commutator plate 182 does not rotate (as suggested by the D shaped mounting aperture 190) and is mounted coaxially within the cylindrically shaped drum 56, up near the hub 166. A thin spacer 192 separates plate 174 from commutator plate 182 so that spring finger contacts 176, 178 and 180 may resiliently contact the conductive ring segments 184, 186 and 188.

A bracket 194 is mounted below commutator plate 182, and is provided with a pair of axially spaced light bulbs 196-196'. These bulbs are radially aligned to direct a sheet of light upon the radially inwardly facing surface of the film strip 58. A keyboard resetting microswitch 198 is mounted on bracket 194, and has an actuating lever 200 located at an angular position which corresponds to the phase of the operating cycle in which the terminal keyboard is to be reset. Switch 198 connects the power line directly to a conventional keyboard resetting solenoid 101 (Schematically illustrated in FIG. 14).

Drum 56 is formed of a ring 202 which, as shown in FIG. 3A, has a recessed annular shoulder 204 over which the film strip 58 is mounted and secured in a closed ring configuration with a suitable adhesive or transparent tape or the like. The film strip is provided with a recess 206 which lines up with a locating pin 208 depending from hub 166 and passing through a slot 207 on the ring 202, to align the film strip 58 radially with the commutator segments 184, 186 and 188. When the film strip is mounted on the drum ring 202, transparent codings 210 on the film strip 58 are thus placed in registration with angular positions on the drum 56 corresponding to appropriate phases of the cycle of operation of the terminal 20.

For fine manual adjustment of this angular registration, the plate 174 is secured to hub 166 by screws 175 passing through arcuate slots 177 and threaded to tapped holes 179. The arcuate lattitude provided by slots 177 permits angular displacement of plate 174 and commutator brushes 176, 178, 180 relative to hub 166, ring 202 and film strip 206 by means of a tool inserted into a slot 181 formed in plate 174.

As can be seen from the views of FIGS. 4, 5, 6, and 7, the actuator components illustrated in FIG. 3 are suspended from an upper housing plate 220. The drum reader 112 is shown in FIG. 5 suspended from a bracket 224 radially opposite the drum lights 196-196' The drum reader 112 is formed of an axially spaced array of photo-conductors 226 which are each aligned radially with respective horizontally disposed rows of transparent codings in the film strip 58. As the drum is rotated by motor 60, a read-out is obtained from the drum photo-conductors 226 during a time period determined by the angular positions of the transparent codings relative to the radial line drawn between lights 196-196' and the photo-conductors 226. A friction fit pin 208 is seen aligning sector gear 62, bull gear 164, hub 166 and drum ring 202.

The friction clutch 66 used to interconnect sector gear 62 with slide pinion 64 is more particularly illustrated in FIG. 6. Drive pinion 138 is keyed by cooperating D-Shapes to a drive shaft 240, and secured thereto vertically by a clip 242. Shaft 240 extends through a bearing 243 and positively engages a flat steel washer 244 overlying a web 246 of the plastic slide pinion 64. A resilient non-planar spring washer 248 is pressure-fit between the pinion 64 and a washer 250. Hence, even when sector gear 62 engages drive pinion 138, the slide 48 may be actuated to effectively override the sector gear engagement. As a result, if a prospective credit customer should change his mind and decide to pay cash after the operating cycle of terminal 20 has been started, the cycle can be aborted by manually pulling out the slide 48, and the customer's credit card can be immediately returned to him at that time. Such withdrawal of the slide will merely slip the clutch 66 without doing any mechanical damage. Moreover, if the cycle has not gone too far, slide withdrawal will also abort the telephone dialing operation, thus saving telephone charges otherwise expended on an unwanted credit check. The latter feature will be better understood in connection with FIGS. 14 and 14A described below.

In FIG. 7 a pin 260 is seen suspended from hub 166 at a radial location selected to engage momentarily the actuator 200 of the keyboard resetting switch 198. Pin 260 is further so angularly located that switch 198 is actuated at the proper time during the operation of the terminal.

Figure 8:
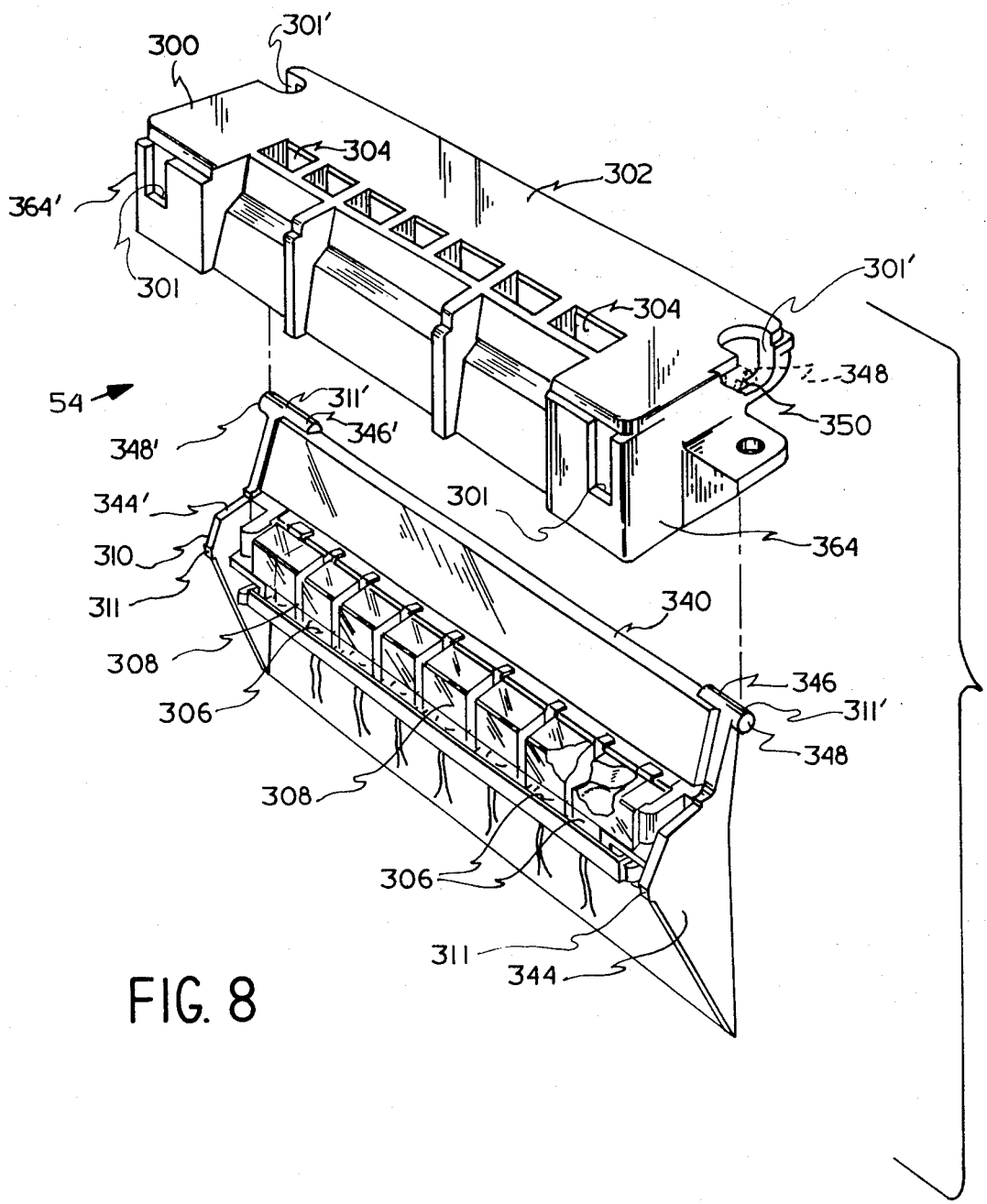
FIG. 8 is a perspective exploded view of an optical credit card reader employed with the terminal actuator shown in FIG. 3.

FIGS. 8 through 10 illustrate the optical credit card reader 54 in detail. An optical mount 300 is provided having a generally flat upper surface 302 with seven spaced viewing ports 304 aligned along a row in registration with photo-detectors 306, each of which is mounted behind focusing lenses 308 set in a lens holder 310. The lens holder is suspended within the mount 300 by a frictional fit, as will be further explained.

The optical credit card reader 54 detects visible light radiating from luminescing code spots 312 on the credit card 152 (see FIG. 11). These spots are imprinted with luminescent materials which are invisible except when irradiated with ultraviolet light. Such materials are well known.

The coding spots 312 are arranged in a manner more particularly described in a co-pending U.S. patent application entitled "Coded Document" filed by Frederick E. Zucker on Oct. 8, 1970, Ser. No. 79,193, and assigned to the same assignee as this application. That patent application explains that the coding spots 312 are arranged in first and second code groups as seen in FIG. 11. The first group 314 has four bit positions and the second code group 316 has three bit positions; one bit in each group being selected to identify each decimal numeral. The optical credit card reader 54 has each of its seven viewing ports 304 in registration with a respective one of the seven rows of coding spots 312 corresponding to the four bit positions 314 and the three bit positions 316. Hence, when the slide 48 is actuated in the direction of arrow 318 to insert the credit card 152 into the terminal, the first column 320 of coding spots is located over the viewing ports 304. If the card is reversed side-to-side when positioned in slide 48, a non-coded area 322 on the card is registered over the lower group 324 of photo-detectors 304 in place of code group 316, so that no light is detected by the photo-detectors 324. This mis-orientation of the credit card 152 is sensed by the terminal to control the latter's operation.

Returning to FIGS. 8 through 10, the lens holder 310 is provided with a rectangular filter 340 selected and positioned to pass only U.V. radiation from a conventional ultraviolet lamp 342 in FIG. 10 to credit card 152. The lamp is preferably a fluorescent discharge bulb coated with U.V. Phosphors, and is energized by a stand-by discharge-sustaining circuit of the type disclosed in the U.S. patent application entitled "-Fluorescent Lamp Idling Circuit," Ser. No. 107,795, filed by James P. Murphy on Jan. 19, 1971, now U.S. Pat. No. 3,679,932, and assigned to the assignee of the present application. The optical mount 300 and lens holder 310 are formed of generally opaque plastic molded material. The lens holder 310 is provided with upwardly extending smooth side walls 344–344' which terminate in filter-frame-forming supports 346–346' and pivot pins 348–348'. The pivot pins rest upon a pair of shelf-like recesses 350–350' respectively in the optical mount. See FIGS. 9 and 10. The lens holder 310 then rotates upwardly (see arrow 362) about pivot pins 348–348' into snap engagement with the optical mount 300, since the dimension across points 311–311' of the lens holder slightly exceeds the dimension across corresponding points 301–301' of the optical mount into which dimension 311–311' fits.

When the parts are thus fitted together, the ultraviolet pass filter 340 then engages snugly a corner-shaped recess 352 formed in the inner surface 354 of the optical mount 300. A visible light band pass filter 341 is mounted on the lens holder 310 to make sure that only the visible luminescent glow of card code spots 312 reaches photo-detectors 306, to the exclusion of any U.V. reflected from card 152.

An advantageous feature of the optical credit card reader 54 resides in the orientation of the optical axes 366 of the lenses 308 relative to the code-bearing surface of credit card 152. As shown in FIG. 10, the lens optical axes 366 are inclined at a small angle, generally of the order of about 10°, relative to a line 368 normal to the credit card 152, in order to enable the ultraviolet light source 342 to be closer to the coding spots 312. Placement of the ultraviolet light source 342 as close as possible to the code-bearing surface of the credit card 152 obtains maximum visible radiation from the luminescent coding spots 312. The slight decrease in the light intensity at the photo-detectors 306 due to the off-normal optical viewing axis is small in comparison to the improved radiation intensity thus obtained.

The operation of the terminal 20 is more clearly explained with reference to FIG. 13 where the commutator plate 182 is shown schematically. The shorting bar 380 (which is affixed to locating plate 180) is electrically connected to and supports the spring loaded contacts 176, 178 and 180. These contacts electrically engage the concentric commutator segments 184, 186 and 188 respectively. The inner commutator segment 184 is electrically connected to an input voltage source, V, to energize spring contacts 178 and 180 through spring contact 176 and shorting bar 380. As the shorting bar is rotated, electrical cycle control signals are distributed to the commutator segments by the contacts 178 and 180.

The commutator segment 186 provides a cycle control signal to actuate (see FIG. 2) the motor 60 and enable the hook control 80. Segment 186 is electrically contiguous, though its circular path opposite the contact 178 is physically severed into commutator segments labelled C, E, and F. The gaps 382 and 384 represent locations where the motor 60 and thus also shorting bar 380 are halted. The commutator segments C, E and F provide correspondingly labelled cycle control signals to initiate various terminal functions as will be described subsequently with reference to FIG. 14.

The outer commutator section 188 is broken into a plurality of segments whose contact with spring contact 180 produces cycle control signals the durations of which are determined by the arcuate lengths of electrically distinct segments A, B, D and G through S which control correspondingly labelled terminal functions.

When the shorting bar 380 is located over segment A, the terminal is in the home position. The terminal is actuated by inserting a credit card into the slide 48 and moving the slide into the terminal to close the slide switch 148 (see FIG. 3). If the card is properly oriented, a keyboard entry made and a dial tone detected, then the motor 60 is actuated to enter the B phase of the operation.

While the shorting bar 380 is in contact with the B segment, the drum 56 is read to decode a stored telephone number encoded on the film strip 58, and a telephone connection with the remotely located data processor is automatically established.

After the telephone dialing operation, the shorting bar 380 is moved over the D segment, where the enabling signal for the motor 60 is cut off because of the gap 382 in commutator section 186. The motor therefore stops to await an acknowledgement signal from the data processor, receipt of which within a prescribed time enables the motor 60 to advance the shorting bar 380 to the G segment.

The G cycle control signal initiates a reading of the drum 56 to transmit terminal identification data to the data processor. After this transmission, the commutator keyboard enabling segments H, J, K, L, M, N and P are sequentially engaged to produce corresponding cycle control signals for transmitting keyboard entry data to the data processor.

When the shorting bar 380 passes over the Q commutator segment the circuitry employed to read the credit card codings is energized while the sector gear 62 (see FIG. 3) commences operative engagement with the slide pinion 64 to retract the slide 48. Retraction of the slide 48 accomplishes a card scanning motion, and is accompanied by detection of the credit card codings and transmission to the data processor.

An end-of-transmission signal is produced when the shorting bar 380 passes the R commutator segment, and thereafter the motor 60 halts when contact 178 encounters gap 384 which separates the segments E and F while the S segment is enabled by the shorting bar 380. This constitutes a pause for receipt of credit authorization instructions.

If instruction signals from the data processor are then received within a prescribed time, the motor is reactivated to complete phase S and the received instructions are displayed when the shorting bar returns to its home position over the A commutator segment.

The operation just described with reference to FIG. 13 is implemented by the cycle controller logic circuitry shown in FIG. 14. The cycle controller 70 includes logic networks which are represented by the conventional symbols for electronic AND and OR circuits, though electro-mechanical relays may also be employed to provide these logic functions. Cycle controller operation is commenced with the insertion of a credit card in the slide 48, which is then pushed in to activate the slide switch 148 (see FIG. 14A). The slide switch 148 is normally open, and is closed by the inward slide movement to couple a voltage source V to a control signal line labelled SS, indicative of slide actuation. Movement of the slide 48 toward switch 148 simultaneously allows a normally closed switch 400 to close and thus generate a control signal labelled UV. This UV signal operates to bring the ultraviolet light source 342, which is used with the optical credit card reader 54 (see FIG. 10), from a standby state to a full-on condition.

When the slide switch 148 is actuated while the commutator is still at its home position A, advancement onto the B, or telephone dialing, segment is not commenced until certain conditions are satisfied. Thus a first condition is the detection of a dial tone. This detection requires removal of the "hook" by providing an off-hook (HO) signal to output line 82 of the hook control section 80. Hook output line 82 is coupled to the coil 402 of a hook relay, which, when actuated, closes a hook line switch 404 connected in series with hook control leads 406-406'. These hook control leads are connected to the data access arrangement 23 (see FIG. 1). The closure switch 404 thus produces a connection from the data lines 86, 88 of FIG. 2 to the telephone line 24 of FIG. 1.

An off-hook (HO) signal, however, is not produced unless both inputs 408 and 410 to a hook control AND gate 412 are active. At the time of closure of slide switch 148, i.e. at the start of the A phase of the cycle, the enabling signal for input line 410 is obtained through OR gate 414 from an AND gate 416. AND gate 416 only produces such enabling signal when the credit card has been properly oriented (causing an active signal on input 418) and an entry has been made in at least one keyboard (causing an active signal on input line 420) while the slide switch 148 is closed (signal SS described above in connection with FIG. 14A). The keyboard 32 is tested for at least one key actuation by applying the A cycle control signal to an input line 422 which is common to each of the keys. The keyboard includes individual numeral key switches each of which, when actuated, enables one output line 104 to the "one-out-of-four" gating network 96 used to select a Touch-Tone frequency at the Touch-Tone transmitter 94. If any non-zero key is depressed, at least one of three keyboard check lines 426 will carry an enabling signal. If the keyboard entry is zero, line 426 fails to drive an OR gate 428 and thus lowers line 420 to inhibit an output from AND gate 416. On the other hand, when any one key carries an entry, the output line 420 from OR gate 428 goes active to enable AND gates 416 and 412 and thereby permit the hook line 82 to take off the hook.

Credit card orientation is sensed by deriving inputs to an OR gate 430 from three credit card check lines 423 connected to the output lines 102 of the card and drum photo-detector signal processor 110. Output lines 102 are connected to "one-out-of-three" gating network 98 the output lines 438 of which select the other frequency tone in the Touch-Tone pair for transmitter 94. This credit card orientation check is initiated by applying the A cycle control signal through an OR gate 440 to the optical credit card reader 54 of processor 110. When the credit card is properly oriented in the slide 48, at least one of the three credit card check lines 432 is active to render output line 418 active, and thus enable AND gate 416 and OR gate 414.

A terminal "ready" indication is generated during the A cycle by applying the A cycle control signal, the inverse off-hook signal derived from lead 82 and inverter 437, and the hang up (HU) signal on input line 410 of AND gate 412, to a ready-signal-generating AND gate 439 in the display section 90. The output of AND gate 439 energizes the "terminal ready" light 36 (see also FIGS. 1 and 2) continuously from the end of each operating cycle until the next terminal operation is commenced.

An off hook (HO) condition is obtained from AND gate 412 when its input line 408 is also made active. This depends upon the state of a timer circuit 450 which has its output 452 coupled to line 408 through an OR gate 454. Timer 450 produces an enabling signal on line 408 for a predetermined time following either a pulse signal applied to input 456 or following a level signal applied to enabling input 458. Thus during the A cycle, when the slide switch is closed, a level enabling signal is generated on the output 460 of AND gate 462 and applied through OR gate 464 to level enabling input 458 of the timer 450. If a dial tone signal is detected by a dial detection network 466 during this timer enabling signal, a dial detect pulse from AND gate 468 is produced and applied through OR gate 470 to input 456 of the timer. The dial detect signal regenerates the timer enabling pulse on line 408 to extend its duration.

The dial detect signal from AND gate 468 is also applied through an OR gate 472 in the transmit section to a pulse generator 474. The pulse obtained from generator 474 is delivered through OR gate 476 to energize the motor 60 which then rotates the shorting bar 380 to the B commutator segment (see FIG. 13). A timer output signal stretcher in the form of a capacitor 478 is used to maintain the hook enabling signal on line 408 while the shorting bar 380 is moved from the A to the B commutation segment.

As soon as the B dialing cycle is commenced the CEF cycle control signal is rendered active (see FIG. 13) and applied through OR gates 454 and 476 respectively to maintain an off-hook condition (i.e., enable gate 412) and continue to run the motor 60. During the B dialing cycle automatic dialing for a telephone connection between the terminal 20 and the remotely located data processor 30 is accomplished.

With the motor 60 energized and the shorting bar 380 located over the dialing segment B of the commutator, the B cycle control signal initiates reading of a telephone number stored on the film strip 58.

The telephone number is decoded and pulses indicative thereof are placed on the data lines 86, 88 to obtain a telephone connection to the data processor. The film strip 58, as shown in FIG. 12, may be coded with transparent spots such as the eight groups of serially spaced spots 480, which correspond to an eight digit pulse-dial telephone number. A pulse-dialing signal as used with conventional rotary dial telephone sets operates when a relay 402, 404 interrupts the continuity of the hook control leads 406–406', whereas a Touch-Tone push-button telephone set transmits each digit in the form of a pair of frequency tones. The film strip 58 may thus be coded with transparent spots that are arranged to select pairs of frequency tones at the Touch-Tone transmitter 94 shown in FIG. 14, in areas where such Touch-Tone dialing can be used. The terminal 20 is conveniently adapted to operate with either pulse dialing or Touch-Tone dialing by controlling the application of a drum-oriented signal either as a pulse-dial signal on lead 413 to OR gate 414 or as a strobe pulse on line 482 to activate the Touch-Tone transmitter 94.

During dial mode operation, the B cycle control signal is applied in the transmit section 83 of FIG. 14 to OR gate 484, the output 485 of which enables the drum reader 112 and also turns on the drum lights 196, 196'. One of the drum photo-detectors is responsive to light passing through the groups of spots 480 on drum film strip 58 (FIG. 12), and the output of reader 112 is applied by lead 487 and amplifier 488 to the inputs of AND gates 490 and 492, along with the SS signal. With switch 494 in the indicated position, the B cycle control signal enables AND gate 490 to generate a pulse dial signal connected over lead 413 to hook control section 80 at OR gate 414. If the film strip 58 is provided with a Touch-Tone dialing code, the drum photo-detectors 112 detect spots on film strip 58 to strobe transmitter 94, switch 494 is moved to apply the B cycle control signal through OR gate 496 to enable AND gate 492, and the output of AND gate 492 is coupled to the strobe input 482 of transmitter 94 through OR gate 498. If the customer decides to pay cash instead of using his credit card, and the card slide 48 is retracted any time before the phone connection is completed to the data processor 30, the gates 490 and 492 are disabled by loss of the slide switch (SS) signal, and dialing is aborted, resulting in a saving of phone charges.

After dialing (or dialing abort), the motor 60 drives the shorting bar 380 (see FIG. 13) to the D segment where the enabling cycle signal C to the motor 60 is removed as a result of gap 382. The motor 60 now stops to await an acknowledgment signal from the data processor 30 to confirm completion of a proper telephone connection. If this acknowledgment signal is not received within a prescribed time as determined by timer 450, the hook line 406 is opened and the terminal 20 cycled home.

The D cycle control signal enables timer 450 through a connection made at OR gate 461. The D cycle control signal also enables an AND gate 510 in the receiver section 84 when that signal coincides with the output from a frequency tone detecting network 580 responsive to signal bursts of 2,025 Hertz sent by data processor 30. Detection of this single burst of 2,025 Hertz is indicated by an HS pulse from gate 510 which is applied to OR gate 470 in the hook control section 80 to re-energize the timer 450, and to OR gate 472 in the motor section 72 to advance the motor and place the shorting bar 380 over the G commutator segment. If no acknowledgment signal is received while the timer 450 is actuated, the enabling signal on line 408 is removed at the end of timer 450 actuation. This allows the hook control line 82 to enter an on-hook condition.

An on-hook condition on line 82 is detected in a recycling network which is formed of an inverter 512 whose output is connected to an AND gate 514 together with the D cycle control signal from OR gate 515. AND gate 514 delivers to the motor 60 through OR gate 476 a signal of sufficient duration to drive the shorting bar 380 onto the E segment of the commutator. Thereafter the terminal returns to its home position. Note that the output of AND gate 514 is connected to an inhibit input 455 of OR gate 454 to prevent an off-hook condition for the remainder of the cycle.

If an acknowledgment signal is timely received, the terminal identification data stored on the film strip 58 is read and transmitted to the data processor 30. This film strip readout is obtained by connecting the G cycle control signal through OR gate 484 in the transmit section 82 to enable each of the photo-detectors in drum reader 112. These are sequentially exposed to illumination in correspondence with the transparent segments 516 (see FIG. 12) on the film strip 58. The drum reader 112 enables one-out-of-three gates 98 and one-out-of-four gates 96 to select pairs of frequency tones at the Touch-Tone transmitter 94. Drum-originated strobe pulses are produced by coupling the G cycle control signal to OR gate 496, which enables AND gate 494 to generate a strobe pulse on line 482. The transmission of the terminal identification data on film strip 58 is completed when the motor 60 has advanced the shorting bar 380 to the H segment of the commutator.

The H cycle control signal then samples the keyboard 32. The keyboard is provided with seven columns 34, each of which may carry a numerical entry from 0 through 9 to represent the dollar amount of a sale, or the numerals on the keyboard may represent other numerical data, and the data processor may be programmed to recognize this. The seven keyboard columns 34 in the terminal 20 are sequentially sampled by keyboard cycle control signals H, J, K, L, M, N, and P respectively. Each one of these cycle control signals derives a signal through keyboard-controlled switches to enable one out of three gates 98 and one out of four gates 96 to select a pair of Touch-Tone frequencies at transmitter 94. Seven consecutive strobe pulses are sent to the Touch-Tone transmitter 94 by applying each one of the keyboard sampling cycle control signals H through P in turn to OR gate 498 (see also FIGS. 13 and 13A).

Figure 15:
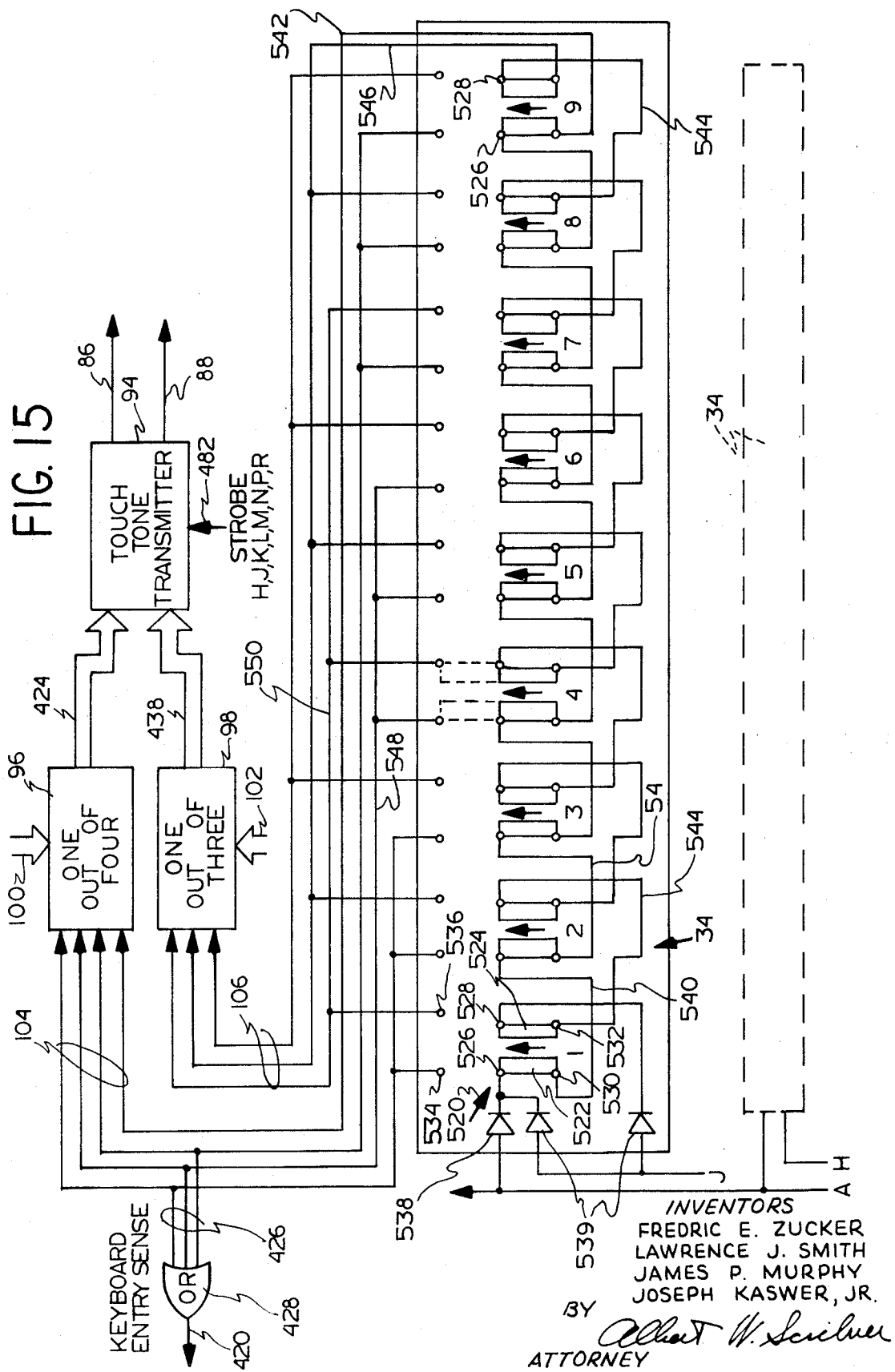
FIG. 15 is a schematic electrical circuit diagram of a keyboard employed with the credit authorization system terminal shown in FIG. 1.

FIG. 15 schematically illustrates the electrical circuit of any one column 34 of the keyboard 32 employed in the terminal 20. Each such column is provided with nine key-operated switches 520, each of which includes a pair of slide contacts 522 and 524. Contacts 522 and 524 always touch stationary contacts 526 and 528 respectively, and are movable between stationary reset contacts 530, 532 and stationary numeral entry contacts 534 and 536.

The keyboard switches 520 are all shown in their reset positions, a condition which corresponds to a zero column entry. The numeral contact pairs 534, 536 are connected to one out of four gates 96 and one out of three gates 98 in a Touch-Tone code pattern to select frequency tone pairs at transmitter 94 corresponding to the numerals 1 to 9 represented by the switches 520 so designated.

The keyboard entry check is initiated by the A cycle control signal which is coupled through a buffering diode 538 to the contact 526 of the numeral 1 switch 520. While in the reset position, contact 522 provides continuity to the reset contact 530 of switch 1, and through leads such as 540 the reset contact 530 of each switch 520 is electrically connected to contact 526 of the next higher numeral switch 520. Thus, in the illustrated zero or reset position, the keyboard switches 520 complete an electrical circuit between contact 526 and lead 542.

The Touch-Tone code is such that at least one of the leads in cable 104 (except lead 546) must carry a signal whenever there is a non-zero keyboard entry. Accordingly, these three leads are sampled by leads 426, OR gate 428, and output 420 to detect a non-zero keyboard condition.

During keyboard entry sampling the J cycle control signal is enabled and applied through twin buffering diodes 539 to both contacts 526 and 528. If all keyboard switches are in the zero or reset position, leads such as 544 connecting the contact 532 of each numeral switch 520 to the contact 528 of the next higher numeral switch 520 provide electrical continuity to lead 546, which is connected to gates 98.

If the keyboard has any non-zero entry, then both leads 542 and 546 are energized by cycle control signal J to select the zero-representing pair of frequency tones at transmitter 94. If the numeral 4 keyboard switch 520 had been actuated, however, as suggested in dotted outline, the leads 548 and 550 would have been rendered active to select another pair of tones at transmitter 94. In this manner each of the keyboard columns 34 is sampled, and pairs of frequency bursts are transmitted to the data processor 30.

When the motor 60 has advanced the shorting bar 380 (see FIG. 13) to the Q commutator segment, a credit card luminescent code reading is commenced, since the sector gear 62 (see FIG. 3) now engages drive pinion 138 to retract the slide 48. The Q cycle control signal is applied to OR gate 440 (FIG. 14) to enable the card photo-detectors, and is also applied to OR gate 414 to prevent a hook hang-up condition when the slide switch signal SS is removed by the retraction of the slide 48.

The Q control signal is also coupled to a card strobe photo-detector 560 (FIGS. 9, 11 and 14) which is located, as shown in FIG. 11, in row alignment with strobe ports 562 formed in the card slide 48. Photo-detector 560 is lined up directly above the center line 561 of the U.V. card reading lamp 542, so as to be illuminated by that lamp as the ports 562 pass over it. It follows that, because of the 10° slant geometry described above (FIG. 9) the photo-detectors 560 is slightly out of column alignment with photo-detectors 304 by a dimension "$d$." Then, subject to the same offset "$d$" to maintain proper timing relative to photo-detector 560, the strobe ports 562 are in column alignment with respective columns 320 of card coding spots 312. This alignment causes photo-detector 560 and its amplifier 561 to drive OR gate 498 and strobe lead 482, thereby actuating the Touch-Tone transmitter 94, each time a column 320 of card spots 314, 316 reaches the card read photo-detectors 304. The timing is such that the signal outputs from the credit card photo-detectors are at a maximum, for optimum signal-to-noise ratio, when the Touch-Tone transmitter output is generated.

After the credit card 152 has been read, the motor 60 drives the shorting bar 380 over the R commutator segment. The R cycle control signal then signifies the end of transmission for the terminal, and is applied to gates 96 and 98 over a lead 99 to select a pair of Touch-Tone frequencies that are recognized by the data processor 30 as the end of transmission from the terminal. Gate 498 is also driven by an R signal to strobe Touch-Tone transmitter 94.

Shortly after the motor 60 has driven the shorting bar 380 to the S commutator segment and over gap 384 (see FIG. 13), the motor is halted to await the first return of instruction data from the data processor 30. The instruction data is formed of bursts of pulses at frequencies of either 2,025 Hz. or 1,017 Hz., and these are detected by suitable frequency detection networks 580 and 582 respectively in the receiver section 84 (FIG. 14). The outputs 584 and 586 from the instruction signal detectors 580 and 582 are coupled to AND gates 588 and 590 respectively, as well as to OR gate 592. The output of OR gate 592 is connected to an input of AND gate 594, as is the S cycle control signal. AND gates 588 and 590 are enabled by either the A or S cycle control signals via OR gate 589, and are connected to drive counters 596 and 598 respectively which drive ten and units digit numerical display devices 42 and 44 respectively (see also FIGS. 1 and 2) for displaying two-digit transaction identification numbers. The counters 596 and 598 are reset by a signal from AND gate 600 which goes active when the terminal is in the home position and the slide switch 148 is closed.

The time for waiting for the first instruction data is determined by timer 450, which is actuated by the S cycle control signal through OR gate 464. If an instruction signal from the data processor 30 is detected before the timer output goes active, a U signal output of AND gate 594 (in the receiver section 84) is used to regenerate the timer 450 (hook control section 80) via OR gate 470. The U signal also advances the motor 60 by a pulse from generator 474 which is triggered by a pulse from OR gate 472. The motor then advances sufficiently for shorting bar 380 to be driven over the F portion of commutator segment 186 which thereafter retains control of the motor drive to deliver the motor 60 to its home position.

In the event an instruction signal is not timely received from the data processor during the wait interval corresponding to commutator gap 384, the line 408 goes inactive and the off-hook condition is terminated. The terminal is thereafter returned to the home position A by a signal from AND gate 514 which also inhibits OR gate 454 to maintain the on-hook condition for the remainder of the terminal cycle.

During the S receive mode of terminal operation several signals are displayed indicating various aspects of the credit requested. In particular, the transaction identifying number display briefly mentioned above is more particularly described in a co-pending U.S. patent application entitled "Data Communication System" filed by Frederic E. Zucker on July 27, 1970, Ser. No. 58,242 and assigned to the same assignee. As described in that application the counters 596 and 598 are coupled to rotating display wheels 42 and 44 which are imprinted with numerals to indicate respectively tens and units in a two-digit transaction number. The wheel displays 42, 44 are provided with rotary commutator switches which each have a pair of blank positions labelled X and Y. The X blanks correspond to reset positions of the respective switch wiper contacts 602 and 604, and the wipers remain there if no pulses are provided to drive counters 596 and 598. The Y blank positions correspond to the application of a single pulse to each counter 596, 598. The receipt of a single 2,025 or 1,017 Hz. burst from the data processor 30 advances the appropriate counter 596 or 598 one position.

The X and Y blank positions of the wipers 602 and 604 are conveniently used to decode special instruction from the data processor. For example, if the data processor 30 concludes that no credit should be granted, a burst of 2,025 Hz. is transmitted and when this is detected counter 596 is advanced one step to locate wiper 602 at position Y. This tens Y position provides an enabling signal to an AND gate 606 which activates the "do not sell" indication 40 if NAND gate output 608 has also gone active, which happens when the slide 48 has been retracted and the terminal 20 is not in any of the Q, R or S operational cycles.

In some circumstances the information received by the data processor may impose certain questions which ought to be discussed by phone with someone at the credit authorization center. A single instruction signal burst of 1,017 Hz. from the data processor 30 advances the units counter 598 to the Y position. The Y position of wiper 604 then provides an enabling signal to an AND gate 612 which activates "call" indication 38.

In the event that the communication line between the terminal 20 and the data processor 30 is defective, so that data transmitted by the terminal is not decipherable, no instruction signal is transmitted. In such case the X positions of both the tens and units display switch wipers 602, 604 provide an enabling signal to an AND gate 614. The other enabling input to AND gate 614 is obtained from NAND gate 610, so that the "incomplete, re-execute" display goes on when the terminal reaches its home position.

CONCLUSION

The advantages of a credit authorization terminal in accordance with this invention may now be appreciated. Fully automatic operation of the terminal is obtained once a credit card has been inserted, sale data entered on the keyboard, and the slide actuated. A digital controller then runs the terminal throughout its cycle. The controller accommodates a variety of terminal conditions such as a last-minute cancellation of the transaction by the customer, in which case manual retraction of the slide is effective to cancel the terminal operation any time prior to credit card reading mode Q of the cycle.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. In a credit authorization terminal adapted for data communication with a remotely located data processor over a telephone line, which terminal includes a credit card reader to provide signals representing coding on a credit card and a keyboard to generate transaction data, and a frequency code transmitter; the improvement comprising:

means for retrievably storing data in the credit authorization terminal, to initiate telephone communication between the terminal and the remotely located data processor to identify the terminal, said data storing means including a strip of film provided with optical coding representing the stored data and means for reading said coding on the film strip, and means for replaceably mounting said film in readable relation thereto;

a cycle controller providing cycle control signals to initiate terminal operations and to control data flow between the terminal and the remotely located data processor, said cycle controller including means for generating a hook signal to control terminal connection to the telephone line and further including a commutator provided with segments and means for sequentially engaging said commutator segments to produce said cycle control signals, said commutator-segment-engaging means being synchronously coupled to the film strip for detection of said film strip codings during a predetermined phase of terminal operation;

means enabled by a cycle control signal for selecting said stored data for initiating telephone connection between the terminal and the remotely located data processor;

means for decoding data received over the telephone line for generating an acknowledgment signal indicating the establishment of communication between the terminal and the remotely located data processor;

means initiated by the acknowledgment signal for sequentially enabling transmission of (a) said stored terminal identification data, (b) keyboard signals indicating entries on said keyboard, and (c) credit card signals representing said credit card coding; and means enabled by a cycle control signal for displaying instruction data received from the remotely located data processor.

2. A credit card authorization system terminal for data communication over a telephone with a remotely located data processor; comprising:

a replaceable data storage device to retain data retrievably for initiating said telephone data communication with the remotely located data processor and to identify said terminal, and means for retrieving said stored data, said device comprising an actuator including a rotatably mounted drum, said drum being formed of a removable film strip mounted about the axis of rotation of the drum to form a hollow cylinder, the film strip including optical codings representative of the retrievable data and means for detecting said film strip codings to retrieve said data;

a controller providing cycle control signals;

means actuated by a cycle control signal for utilizing retrieved data to establish telephone communication with the remotely located data processor;

a keyboard for entering transaction data;

means actuated by a cycle control signal for sensing keyboard entries and generating signals representative thereof;

a credit card reader to sense coded indicia on a credit card and generate signals representative thereof;

means coupled to said rotatably mounted drum for producing a relative scanning movement between the credit card reader and the credit card during a preselected portion of the angular movement of the rotating drum;

means selectively enabled by the cycle control signals for transmitting station identification signals, keyboard entry signals and credit card indicia signals over the telephone communication line to said remotely located data processor;

means enabled by a cycle control signal for identifying instruction signals received from the remotely located data processor; and means to display credit authorization instructions.

3. A cycle controller for a credit authorization system terminal, said terminal having a keyboard for entering data related to the transaction and a credit card reader to decode indicia on a credit card and being adapted for data communication over a telephone line with a remotely located data processor; said cycle controller comprising:

means for generating sequential cycle control signals which are representative of the operating cycle of the terminal;

means responsive to a control signal indicative of a telephone dial cycle for initiating telephone connection between the terminal and the remotely located data processor;

means for interrupting the generation of cycle control signals for a time period which terminates upon the receipt of an acknowledgment signal from the data processor within a preselected time duration following said telephone dial cycle;

means enabled by a control signal indicative of a station identification transmittal cycle for generating terminal-identifying signals for transmittal over the telephone line to said data processor;

means enabled by control signals indicative of a keyboard read-out cycle for sensing keyboard entries and generating keyboard signals indicative thereof for transmittal over the telephone line to the data processor;

means enabled by a control signal indicative of a credit card read cycle to actuate said credit card reader and generate credit card signals representative of said indicia for transmittal over the telephone line to said data processor;

means responsive to selected ones of said credit card signals for generating a credit card orientation signal indicative of the orientation of the credit card;

means for checking the keyboard for an entry and producing a signal indicative of the results of said check; and means responsive to a credit card orientation signal indicative of credit card mis-orientation or to a keyboard entry check signal indicative of a predetermined minimum keyboard entry for inhibiting the generation of cycle control signals;

means enabled by a control signal representative of an instruction data receiving cycle for decoding instruction signals received over the telephone line from said data processor; and means for displaying said decoded instruction signals.

4. The terminal of claim 2 wherein said means for producing scanning movement includes a sector gear having a gear-toothed segment selectively angularly located to effect said scanning movement.

5. A cycle controller for a credit authorization system terminal having a keyboard for entering data related to a transaction, a credit card reader for detecting codings on a credit card and a frequency tone selector for transmission of keyboard, credit card and terminal data over telephone lines to a remotely located data processor; comprising:

means initiated by the insertion of a credit card into the terminal for establishing telephone connection between the terminal and the data processor;

means responsive to a selected condition of the keyboard for generating a signal indicative thereof;

means for sensing the erroneous orientation of an inserted credit card and producing a signal indicative thereof; and means responsive to the signal indicative of the selected condition of the keyboard and the signal indicative of the erroneously oriented credit card for inhibiting said means for establishing telephone connection between the terminal and the remotely located data processor.

6. A terminal for a credit authorization system, comprising:

a housing;

a motor mounted within the housing;

a commutator mounted in the housing, said commutator being provided with electrically conductive commutation segments to define an operating cycle for the terminal;

means coupled to the motor for sequentially providing said commutator segments with voltages to generate cycle control signals;

a drum mounted within the housing and coupled to the motor for rotation thereby, said drum being provided with a film strip having areas of varying transparency representative of stored data which identify the terminal and which enable the terminal to establish telephone communication with external devices;

means for detecting said areas of varying transparency to produce signals representative of said film stored data;

said film being mounted in pre-selected registration relative to said commutator to enable said detecting means to generate signals during predetermined portions of the operating cycle of the terminal;

means for reading machine-detectable coding on a credit card and producing credit card indicia signals representative of the codings;

means mounted in the housing for receiving said credit card and locating said credit card in a predetermined detectable orientation relative to said credit card reading means;

means coupled to said motor for providing relative scanning motion between the credit card and the credit card reading means during a predetermined segment of the operating cycle of the terminal and generating said credit card indicia signals; and display means for indicating terminal operating status and credit authorization data.

7. A terminal for a credit card authorization checking system, comprising:

a terminal housing, a slide mounted in the housing for movement from an initial start-up position to an actuated position, said slide having a recess shaped to receive a credit card having machine-detectable codings;

switch means mounted in operative relationship to the slide to provide a terminal-actuating signal upon movement of the slide to the actuated position;

an actuator section mounted in the terminal housing and operatively coupled to the slide for retraction thereof during terminal operation;

a data storage drum mounted for rotation about an axis within the terminal housing and operatively coupled to the motor for rotation thereby;

a commutator mounted coaxially with the drum axis and angularly registered therewith to provide cooperative synchronized operation therewith during terminal operation, said commutator segment providing terminal cycle control signals to initiate terminal events;

a sector gear mounted coaxially with the drum axis and located to engage the slide for retraction thereof, said sector gear being selectively angularly aligned with the drum and commutator to effect said slide retraction in correspondence with a selected commutator-generated cycle control signal.

* * * * *